United States Patent
Amro

[11] Patent Number: 5,936,623
[45] Date of Patent: *Aug. 10, 1999

[54] METHOD AND APPARATUS FOR SELECTING A PARTICULAR OBJECT FROM AMONG A LARGE NUMBER OF OBJECTS

[75] Inventor: Hatim Yousef Amro, Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,449

[22] Filed: Nov. 18, 1996

[51] Int. Cl.⁶ .................................. G06F 5/00; G06F 3/14
[52] U.S. Cl. ........................ 345/348; 345/341; 345/973; 345/347
[58] Field of Search .................................. 345/339, 340, 345/348, 349, 347, 341, 973, 975, 123, 311

[56] References Cited

U.S. PATENT DOCUMENTS

| | | | |
|---|---|---|---|
| 4,692,858 | 9/1987 | Redford et al. ........................ | 364/200 |
| 4,727,473 | 2/1988 | Anderson et al. ..................... | 364/188 |
| 5,202,961 | 4/1993 | Mills et al. ............................. | 395/159 |
| 5,301,270 | 4/1994 | Steinberg et al. ..................... | 395/161 |
| 5,447,164 | 9/1995 | Shaya et al. ........................... | 128/710 |
| 5,485,174 | 1/1996 | Henshaw et al. ...................... | 345/123 |
| 5,488,685 | 1/1996 | Palmer et al. ......................... | 395/157 |
| 5,500,936 | 3/1996 | Allen et al. ............................ | 395/156 |
| 5,621,906 | 4/1997 | O'Neill et al. ......................... | 345/355 |
| 5,655,094 | 8/1997 | Chine et al. ........................... | 345/341 |
| 5,664,132 | 9/1997 | Smith .................................... | 345/352 |

*Primary Examiner*—Raymond J. Bayerl
*Assistant Examiner*—Cao H. Nguyen
*Attorney, Agent, or Firm*—Richard A. Henkler; Andrew J. Dillon

[57] ABSTRACT

A method and apparatus in a data processing system for selecting a particular object from among a large number of objects utilizing a selector icon displayed within the data processing system. In response to user input, an extended region of the selector icon is displayed. The extended region includes scan speed indicia such as a lined scale. A selection indicium is moved into the extended region, and thereafter, a particular scan speed indicium from among a large number of scan speed indicia is selected. Thereafter, a particular object is scanned from among a large number of objects at a scanning speed related to the selected scan speed indicia such that a particular object from among a large number of objects may be efficiently located. Objects chosen may be numbers from among a large group of numbers.

10 Claims, 5 Drawing Sheets

METHOD AND APPARATUS FOR SELECTING A PARTICULAR OBJECT FROM AMONG A LARGE NUMBER OF OBJECTS

BACKGROUND OF THE INVENTION

1. Technical Field

The present invention relates, in general, to improved data processing systems and, more particularly, to computer systems and computer displays that include data display regions which display icons. More particularly, the present invention relates to an improved graphical user interface and to a method and apparatus for selecting objects and utilizing graphical user interface icons from among a large number of objects. Still more particularly, the present invention relates to a method and apparatus for selecting a large number from among a large group of numbers.

2. Description of the Related Art

A variety of graphical user interfaces have been developed to ease human interaction with computer systems. Many graphical user interfaces utilize metaphors in the design of the interface as a way of maximizing human familiarity and conveying information between the user and computer. Through the use of familiar metaphors, such as desktops, notebooks, and the like, the interface takes advantage of existing human mental structures to permit a user to draw upon the metaphor analogy to understand the requirements of a particular computer system.

In current generation systems, it is common for computer systems to incorporate so-called "object-oriented" display systems which utilize multiple "windows" on a display in which combinations of text and graphics are disposed. Using a "desktop" metaphor, the windows may take the form of a variety of objects, such as file folders, loose leaf binders, or simple rectangles, and the windows may overlap one another with the "top" window constituting the current work file. A user working within the context of a window-based graphical user interface can operate on objects commonly found in an office, and therefore, provides non-expert users with familiar surroundings in which to interact with data processing systems.

Thus, a graphical user interface is a type of display format that enables a user to choose commands, start programs, and see lists of files and other options by pointing to pictorial representations and lists of menu items on the screen. Choices can generally be activated either with a keyboard or a mouse. For application developers, graphical user interfaces offer an environment that can handle direct interaction with the computer. Such an environment frees the developer to concentrate on a given application without becoming entangled in the details of a screen display or mouse and keyboard input. A graphical user interface also enables programmers to create programs that always handle frequently performed tasks, such as saving a data file. The graphical user interface itself provides standard controlling mechanisms such as windows and dialog boxes. Another benefit is that applications written for graphical user interfaces are device independent: as the graphical user interface changes to support new input and output devices, such as large screen monitors or optical storage devices, the applications can, without modifications, utilize those devices.

In a typical window-based graphical user interface system, visually distinct display objects are provided on the display screen and are commonly referred to as "icons." Each icon represents a function or an object on the desktop. In many systems, a cursor is also displayed which may be selectively moved in response to the movement of a mouse or other pointer control device. The cursor may be moved over display objects which the user may select on the screen. The user may delete information from a window, move data from one window to another, and generally operate on the windows as if an actual file or other physical object is being manipulated.

Selecting a particular object from among a number of very large objects in a graphical user interface environment is a difficult task. On particular, selecting a particular object such as a number from among a group of very large numbers in a graphical environment poses difficulties to the user, and can be typically accomplished through the utilization of "spin buttons." Spin buttons, in a graphical user interface environment, are icons which allow a user to select large numbers, albeit at a very slow rate. Spin buttons are well-known in the art of number selection, particularly in graphical user interface environments.

However, utilizing spin buttons to select numbers can be a painful experience to the user. For example, if a user desires to select the number 855,492,776 using a graphical user interface spin button that starts counting clicks at 0, it may take approximately 237,636 hours (27 years) to accomplish this simple task. The user is unable to control the rate at which the number selector changes numbers for selection. A need thus exists for a graphical-user-interface-based icon or "button" that will save time and aggravation to a user by allowing the user to select large objects or large numbers in a very short time (e.g., seconds). A need also exists for a graphical-user-interface-based icon that allows a user to control the rate at which such a selector increments a counter. A graphical-user-interface-based icon that also allows a user to program the speed and rate of change dependent upon a largest allowable number is also a goal sought by users of graphical-user-interface-based number selectors, but which is not provided by current graphical-user-interface spin buttons.

SUMMARY OF THE INVENTION

It is therefore an object of the present invention to provide for an improved data processing system.

It is another object of the present invention to provide a computer system and computer display that includes data display regions which display icons.

It is still another object of the present invention to provide for an improved graphical user interface in a data processing system for selecting objects from among a large group of objects utilizing a graphically displayed selector icon.

It is yet another object of the present invention to provide for an improved graphical user interface in a data processing system for selecting numbers from among a large group of numbers utilizing a graphically displayed selector icon.

The above and other objects are achieved as is now described. A method and apparatus in a data processing system for selecting a particular object from among a large group of objects utilizing a selector icon graphically displayed within the data processing system. In response to a particular user input, the selector icon is graphically augmented to include an extended region wherein selectable scan speed indicia are displayed. The selectable scan speed indicia graphically displayed within the extended region may be configured as a lined scale. A graphical pointer can then be moved into the extended region, and thereafter, a first scan speed indicium may be selected from among the selectable scan speed indicia utilizing said graphical pointer. A particular object can be scanned from among a large group of objects at the first scan speed, in response to the selection thereof. Next, a second scan speed indicium is selected from among the selectable scan speed indicia utilizing the graphical pointer. Thereafter, another object is scanned from among the large group of objects at the second scan speed, in response to the selection thereof, such that a range of objects may be scanned via the extended region of the selector icon at multiple scan speeds.

Objects, including numbers, may be scanned and selected utilizing the method and apparatus of selecting particular objects from among a large group of objects. The extended region may be displayed as an extended northern region or an extended southern region of the selector icon. When the graphical pointer is moved into an extended region having a lined scale, a counter associated with the selector icon begins counting numbers at a slow rate. As the graphical pointer moves up an ascending lined scale of a northern region, for example, the rate at which the numbers change in the counter and the increment at which the numbers change are increased proportionally. Likewise, when the graphical pointer moves down a descending lined scale of a southern region, the rate at which the numbers change in the counter and the increment at which the numbers change are decreased proportionally. Thus, objects chosen may be numbers from among a large group of numbers.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
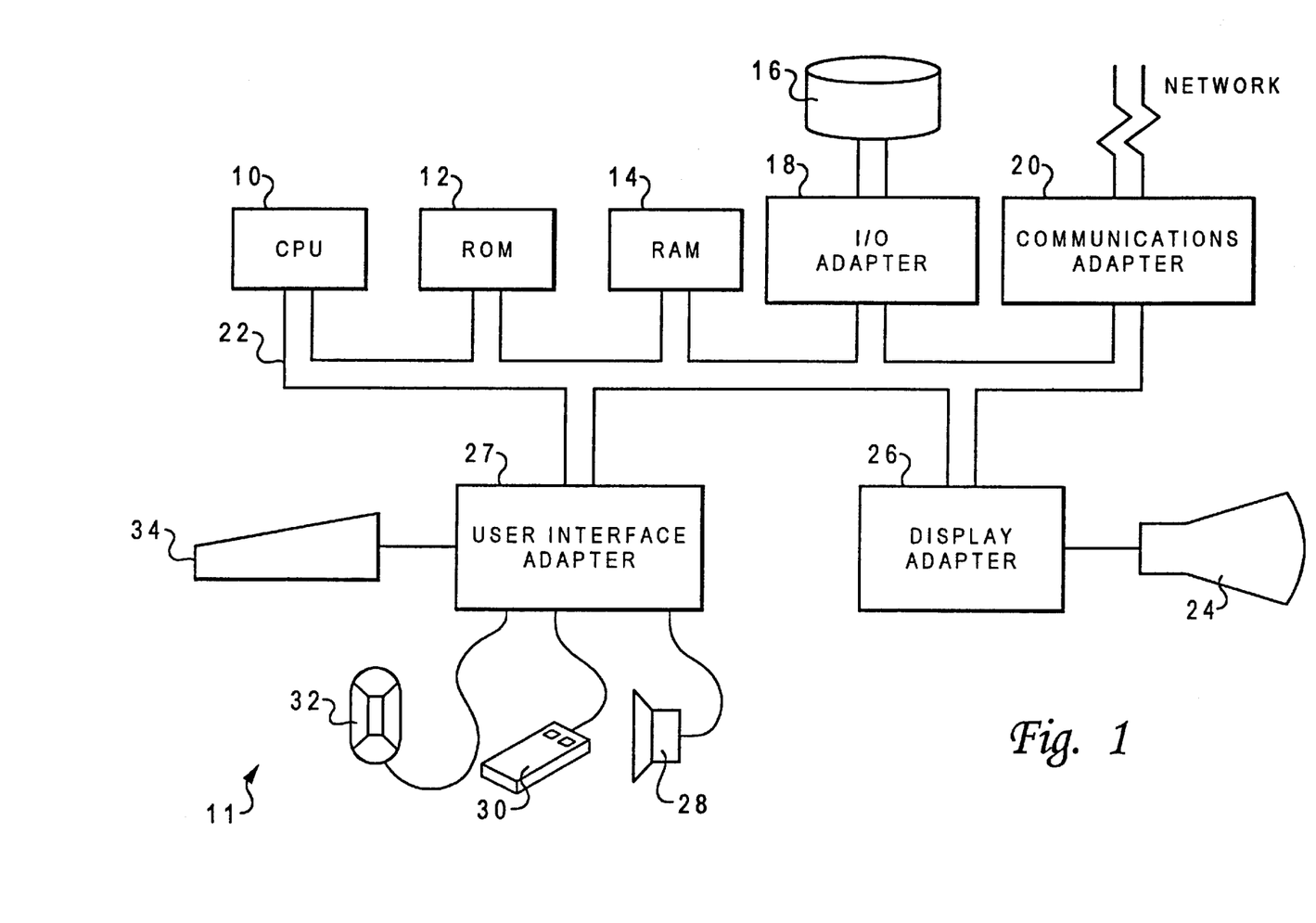
FIG. 1 illustrates a diagram of a representative hardware environment which can be utilized in accordance with the method and apparatus of the present invention.

With reference now to the figures and in particular with reference to FIG. 1, a workstation 11 which may be utilized in accordance with the present invention is depicted. Workstation 11 includes a central processing unit ("CPU") 10, such as a conventional microprocessor, and a number of other units interconnected via system bus 22. Workstation 11 also includes random access memory ("RAM") 14, read only memory ("ROM") 12, display adapter 26 for connecting system bus 22 to display device 24, and input/output ("1/O") adapter 18 for connecting peripheral devices (e.g., disk and tape drives I S) to system bus 22. Workstation 11 further includes user interface adapter 27 for connecting keyboard 34, mouse 30, speaker 28, microphone 32, and/or other user interface devices, such as a touch screen device (not shown), to system bus 22. Communication adapter 20 connects workstation 11 to a data processing network. Workstation 11 also preferably includes a graphical user interface (e.g., Motif Window Manager) that resides within a machine-readable media to direct the operation of workstation 11. Any suitable machine-readable media may retain the graphical user interface, such as RAM 14, ROM 12, a magnetic diskette, magnetic tape, or optical disk (the last three being located in disk and tape drives 16).

Figure 2:
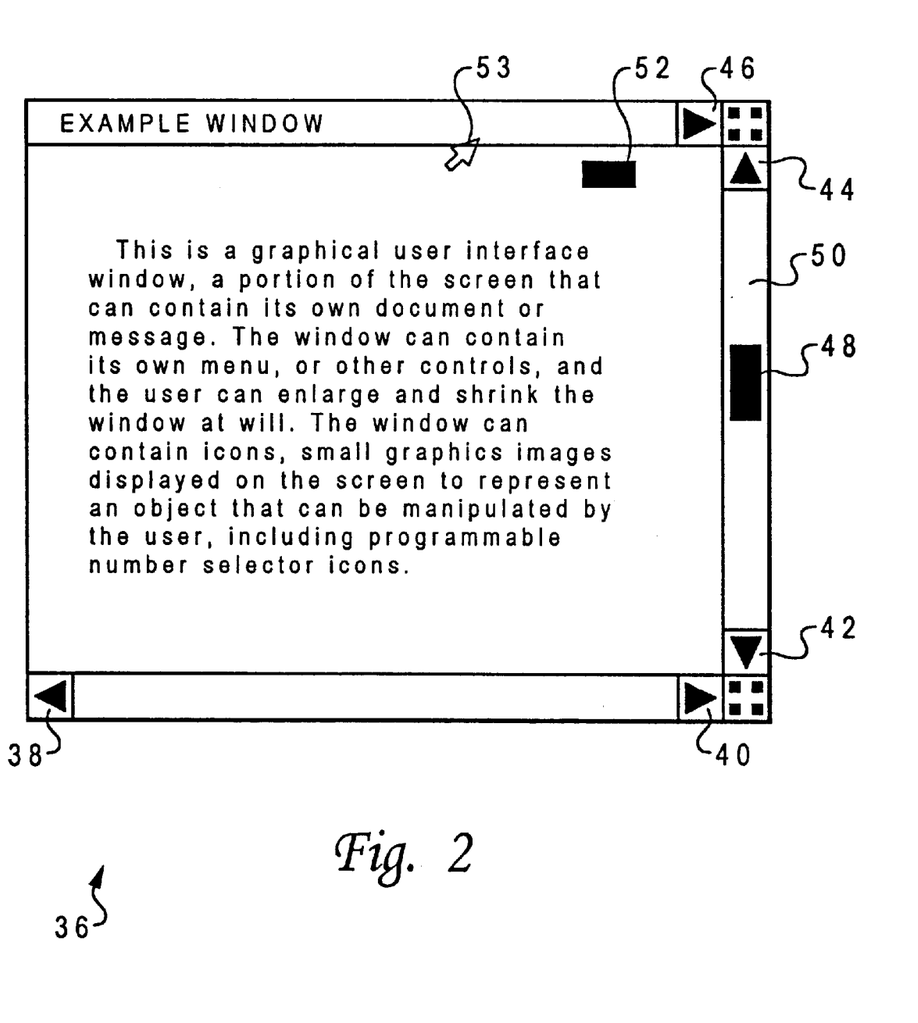
FIG. 2 is an illustration of a graphical user interface window which can be utilized in accordance with the method and apparatus of the present invention.

FIG. 2 depicts a window 36 that is controlled by a graphical user interface in accordance with the method and apparatus of the present invention depicted. Window 36 is a portion of a monitor screen that can contain its own document or message, including its own menu or other controls. A user of window 36 in a graphical user interface environment can enlarge and shrink the window at will. The window can contain icons, small graphics images displayed on the screen to represent an object that can be manipulated by the user, including programmable large-number-selector icons. The size and position of elevator 48 within scroll bar 50 corresponds to the size and position of the current viewable page in relation to the document or message displayed within window 36.

Because a document or message may include too many pages to view simultaneously, the user can position a mouse cursor over arrow section 42 or arrow section 44 of scroll bar 50 and click a pointing device (e.g., a mouse) to scroll the document upward or downward, as appropriate. The user can also scroll left or right using arrow section 38 or arrow sections 40 and 46. Also, a programmable large-number selector 52, as described herein, can be positioned within window 36 for utilization by a graphical-user-interface user. A selector indicium 53 is also located within window 36. Selector indicium 53 can preferably be a mouse pointer (i.e., a cursor) typically utilized in commercially available graphical user interface environments.

Figure 3:
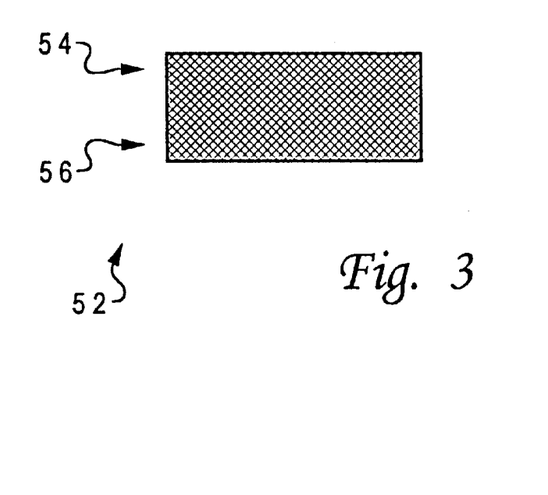
FIG. 3 depicts a programmable large-number selector which can be utilized in a graphical user interface window environment in accordance with the method and apparatus of the present invention.
Figure 4:
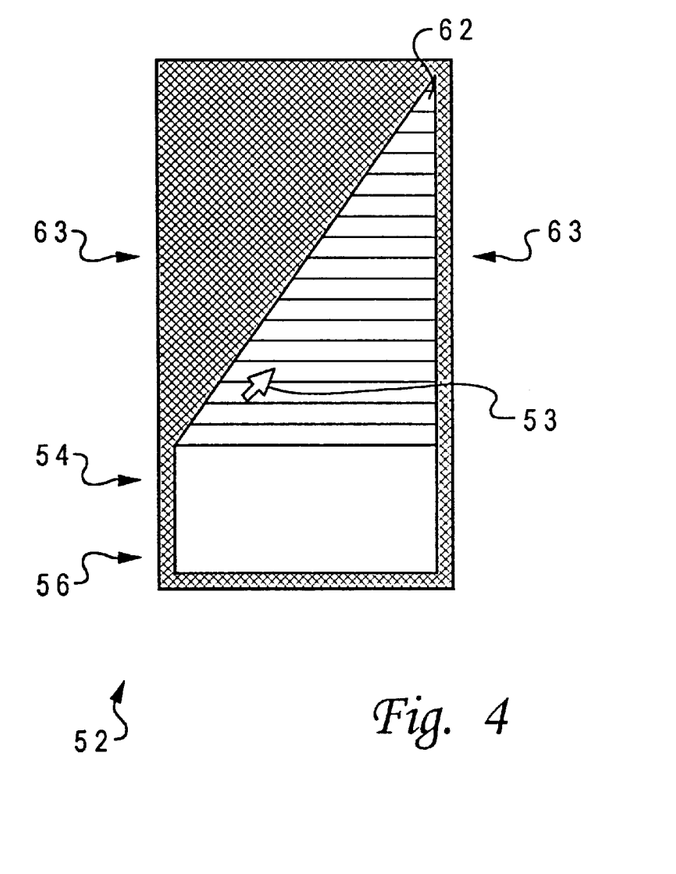
FIG. 4 depicts a programmable large-number selector extended upward which can be utilized in a graphical user interface window environment in accordance with the method and apparatus of the present invention.
Figure 5:
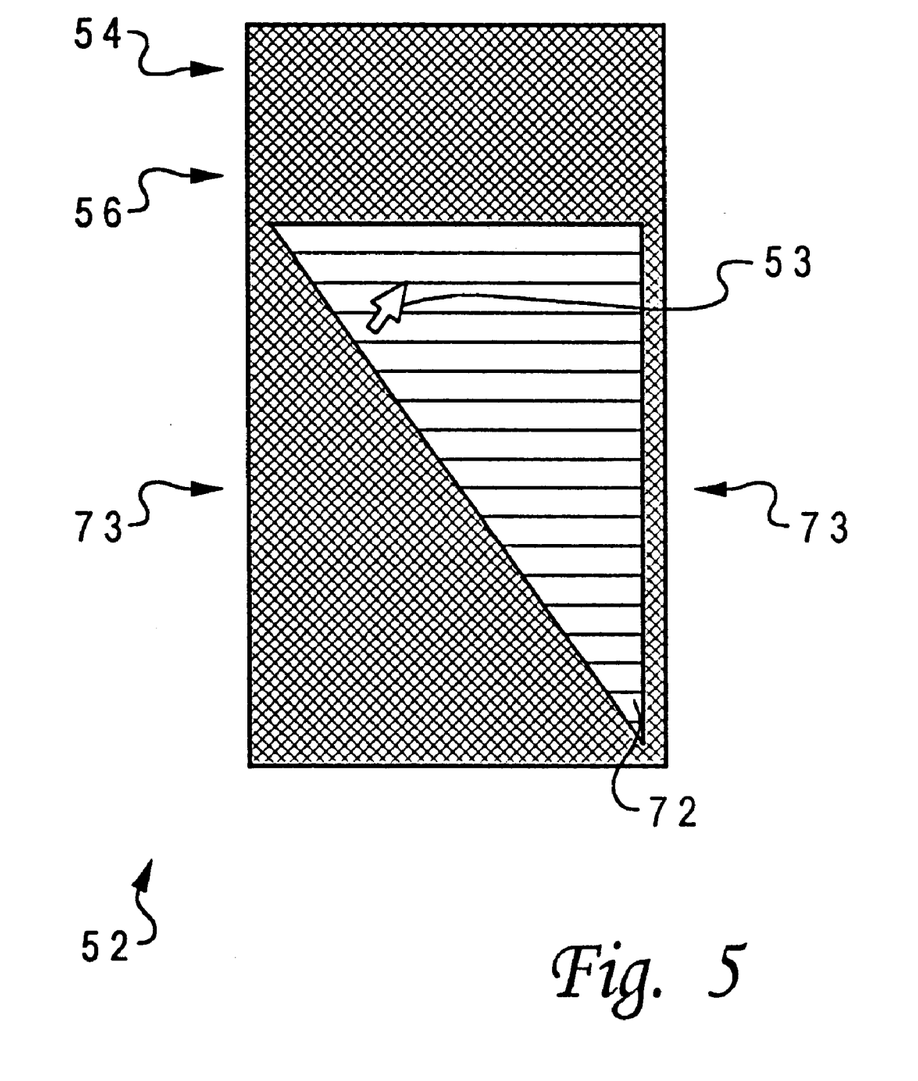
FIG. 5 depicts a programmable large-number selector extended downward which can be utilized in a graphical user interface window environment in accordance with the method and apparatus of the present invention.

In FIGS. 3, 4, and 5 described herein, like parts are indicated by like numbers. FIG. 3 depicts a programmable large number selector 52 which can be utilized in a graphical-user-interface window environment in accordance with the method and apparatus of the present invention. Programmable large-number selector 52 is a graphical-user-interface icon which represents an object that can be manipulated by the user, and can appear as a regular button (i.e., icon). Programmable large-number selector 52 can be used in conjunction with window 36 of FIG. 2. Programmable large-number selector 52 includes a northern region 54 and a southern region 56. When a user points a cursor with, for example, a mouse, at either northern region 54 or southern region 56 of programmable large-number selector 52, and presses the left mouse button down, programmable large-number selector 52 will extend in either a northern (i.e., upward) direction or a southern (i.e., downward) direction, depending upon which region the cursor is located.

FIG. 4 depicts programmable large-number selector 52 extended upward which can be utilized in a graphical user interface window environment in accordance with the method and apparatus of the present invention. When the user points the cursor at programmable large-number selector 52 in its original or closed position, and pushes the left mouse button down, programmable large-number selector 52 will extend in a northern direction or a southern direction, depending upon which region of programmable large-number selector 52 the cursor is located. If the cursor is in northern region 54 of programmable large-number selector 52, and the left button is pressed by the user, programmable large-number selector 52 extends upward to reveal an ascending lined scale 62. The ascending lined scale is one type of scan speed indicia.

In the example of FOG. 4, the cursor was originally placed in northern region 54 of programmable large-number selector 52, not the southern region 56 of programmable large-number selector 52. In response to pointing the cursor at northern region 54 and clicking the appropriate mouse button, programmable large-number selector 52 extends upward to reveal an extended region 63 having a descending lined scale 62. When the cursor is moved into extended region 63, a counter associated with programmable large-number selector 52 begins to count numbers upward at a slow rate. As the cursor is moved up ascending lined scale 62, the rate at which the numbers change in the counter and the increment at which the numbers change are increased proportionally. Depending on the intended use of programmable large-number selector 52 and the largest value allowed to be selected, the increasing rate of change of programmable large-number selector 52 can be pre-programmed. For example, programmable large number selector 52 may begin counting at an increment of one and increase as the user moves the cursor up to 10, 100, 1000, 10,000, etc.

FIG. 5 depicts a programmable large-number selector 56 extended downward which can be utilized in a graphical user interface window environment in accordance with the method and apparatus of the present invention. When the user points a cursor (e.g., selector indicium 53) at programmable large-number selector 52 in its original or closed position and pushes the left mouse button down, programmable large-number selector 52 extends upward or downward from its original position, depending upon which region, southern region 56 or northern region 54, the cursor is located. Thus, if the cursor is in the southern region 58 of programmable large-number selector 52, and the left button is pressed by the user, the programmable large-number selector is extended downward to reveal a descending lined scale. The descending lined scale is another type of scan speed indicia. The cursor itself is one type of a graphical pointer.

In the example depicted in FIG. 5, the cursor (e.g., selector indicium 53) was originally placed in the southern region 56 of programmable large-number selector 52, not the northern region 54 of programmable large-number selector 52. In response to pointing the cursor at southern region 56 and clicking the appropriate mouse button, programmable large-number selector 52 extends downward to reveal an extended region 73 having a descending lined scale 72. When the cursor is moved into extended region 73, a counter associated with programmable large-number selector 52 begins to count numbers downward at a slow rate. As the cursor is moved down descending lined scale 72, the rate at which the numbers change in the counter and the increment at which the numbers change are increased proportionally. Depending on the intended use of programmable large-number selector 52 and the largest value allowed to be selected, the increasing rate of change of programmable large-number selector 52 can be pre-programmed. For example, programmable large-number selector 52 may begin counting at an increment of one and increase as the user moves the cursor up to 10, 100, 1000, 10,000, etc.

Figure 6:
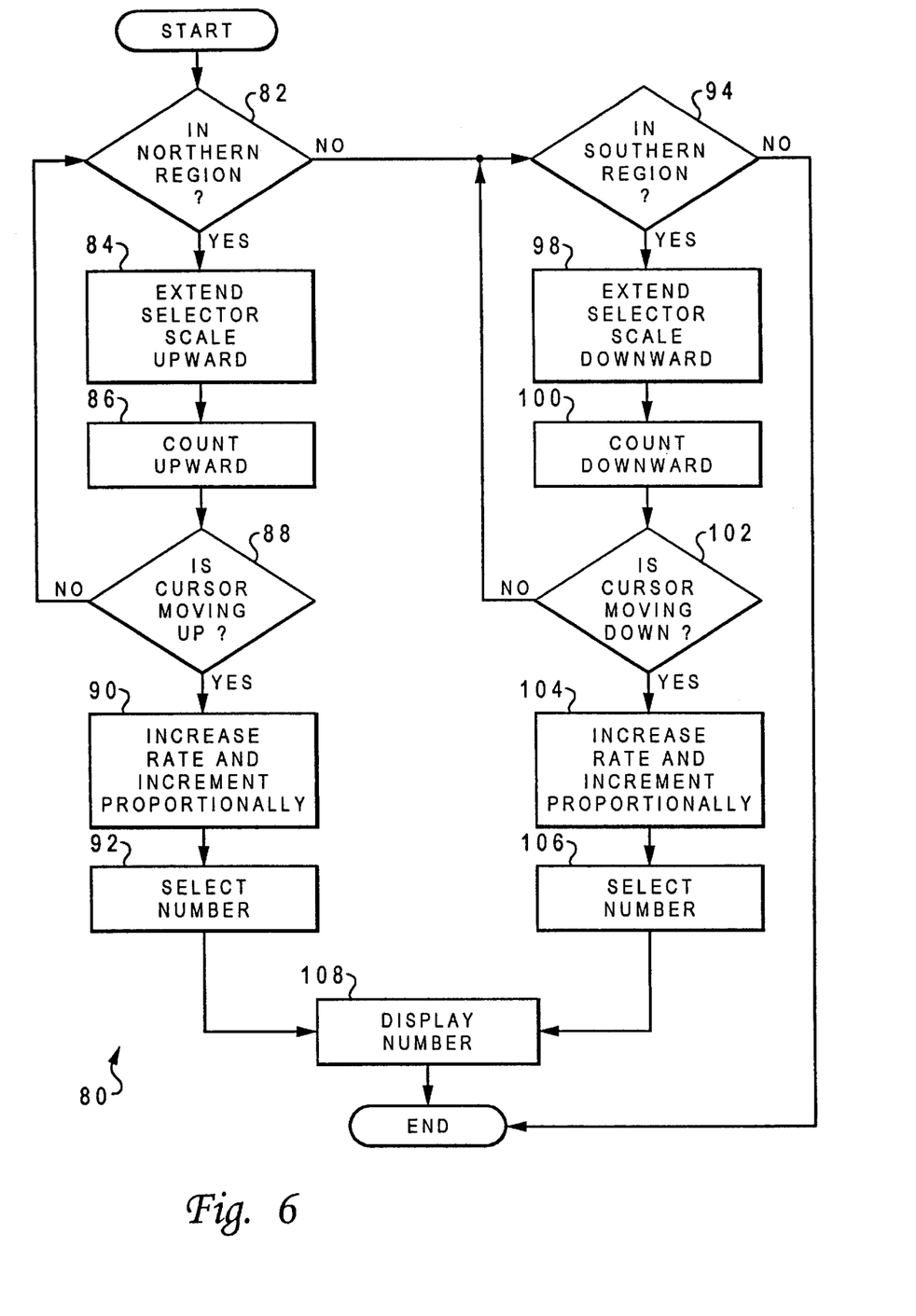
FIG. 6 illustrates a detailed logic flow chart illustrative of operations for a programmable large-number selector which may be utilized in accordance with the method and apparatus of the present invention.

FIG. 6 illustrates a detailed logic flowchart 80 illustrative of operations for a programmable large-number selector which can be utilized in accordance with the method and system of the present invention. As illustrated at block 82 and block 84, the programmable large-number selector, if In the northern region, will extend an ascending lined scale upward. As depicted at block 86, when the cursor is moved into the extended section of the programmable large-number selector, a counter associated with the programmable large-number selector begins counting upward at a slow rate. As illustrated at block 88, if the cursor is moved up the ascending lined scale, then as depicted at block 90, the rate at which the numbers change in the counter and the increment at which the numbers change increase proportionally. If, as depicted at block 88, the cursor is not moved upward, then the process begins again, as depicted at block 82, to determine in which region the cursor is located. Depending on the intended use of the selector and the largest value allowed to be selected, the programmable large-number selector's increasing rate of change can be pre-programmed by the user. As depicted at block 92, the number is finally selected. As illustrated at block 108, the number is displayed for the user.

As illustrated at block 94 and block 98, the programmable large-number selector, if in the southern region, will extend the descending lined scale downward. If the cursor is not in the southern region and not in the northern region, then the process ends. As depicted at block 100, when the cursor is moved in the extended section of the programmable large-number selector, a counter associated with the programmable large-number selector will begin to count downward at a slow rate. As illustrated at block 102, if the cursor is moved down the descending lined scale, then as depicted at block 104, the rate at which the numbers change in the counter and the increment at which the numbers change increase proportionally. If, as depicted at block 102, the cursor is not moved upward, then the process will begin again, as depicted at block 94, to determine if the cursor is located in the southern region. As depicted at block 106, the number is finally selected. As illustrated at block 108, the number is displayed for the user.

While the invention has been particularly shown described with reference to a preferred embodiment, it will be understood by those skilled in the art that various changes in form and detail may be made therein without departing from the spirit and scope of the invention.

What is claimed is:

1. A method in a data processing system for selecting a particular object from among a plurality of objects at a particular scan speed utilizing a selector icon graphically displayed within said data processing system, said method comprising the steps of:

graphically altering said selector icon, in response to a particular user input, such that said selector icon is graphically augmented to include an extended region wherein a plurality of selectable scan speed indicia are displayed;

moving a graphical pointer into said extended region of said selector icon;

selecting a first scan speed indicium from among said plurality of selectable scan speed indicia utilizing said graphical pointer;

scanning for a particular object from among a plurality of objects at said first scan speed, in response to said selection thereof;

selecting a second scan speed indicium from among said plurality of selectable scan speed indicia utilizing said graphical pointer; and scanning for another object from among said plurality of objects at said second scan speed, in response to said selection thereof, such that a range of objects may be scanned via said extended region of said selector icon at multiple selectable scan speeds.

2. The method of claim 1 further comprising the steps of:

graphically altering said selector icon, in response to a particular user input, such that said selector icon is graphically augmented to include an extended northern region wherein a plurality of selectable scan speed indicia are displayed;

moving a graphical pointer into said extended northern region of said selector icon;

selecting a first scan speed indicium from among said plurality of selectable scan speed indicia utilizing said graphical pointer;

scanning for a particular object from among a plurality of objects at said first scan speed, in response to said selection thereof;

selecting a second scan speed indicium from among said plurality of selectable scan speed indicia utilizing said graphical pointer; and scanning for another object from among said plurality of objects at said second scan speed, in response to said selection thereof, such that a range of objects may be scanned via said extended northern region of said selector icon at multiple scan speeds.

3. The method of claim 2 further comprising the steps of:

graphically altering said selector icon, in response to a particular user input, such that said selector icon is graphically augmented to include an extended southern region wherein a plurality of selectable scan speed indicia are displayed;

moving a graphical pointer into said extended southern region of said selector icon;

selecting a first scan speed indicium from among a plurality of selectable scan speed indicia utilizing said graphical pointer;

scanning for a particular object from among a plurality of objects at said first scan speed, in response to said selection thereof;

selecting a second scan speed indicium from among said plurality of said selectable scan speed indicia utilizing said graphical pointer; and scanning for another object from among said plurality of objects at said second scan speed, in response to said selection thereof, such that a range of objects may be scanned via said extended southern region of said selector object at multiple selectable scan speeds.

4. The method of claim 1 wherein the step of scanning for a particular object from among a plurality of objects at said first scan speed, in response to said selection thereof, further comprises the step of:

scanning for a particular number from among a plurality of numbers at said first scan speed, in response to said selection thereof.

5. The method of claim 4 wherein the step of scanning for another object from among said plurality of objects at said second scan speed, in response to said selection thereof, such that a range of objects may be scanned via said extended region of said selector icon at multiple selectable scan speeds, further comprises the step of:

scanning for another number from among said plurality of numbers at said second scan speed, in response to said selection thereof, such that a range of numbers may be scanned via said extended region of said selector icon at multiple selectable scan speeds.

6. An apparatus in a data processing system for selecting a particular object from among a plurality of objects utilizing a selector icon graphically displayed within said data processing system, said apparatus comprising:

means for graphically altering said selector icon, in response to a particular user input, such that said selector icon is graphically augmented to include an extended region wherein a plurality of selectable scan speed indicia are displayed;

means for moving a graphical pointer into said extended region of said selector icon;

means for selecting a first scan speed indicium from among a plurality of selectable scan speed indicia utilizing said graphical pointer;

means for scanning for a particular object from among a plurality of objects at said first scan speed, in response to said selection thereof;

means for selecting a second scan speed indicium from among said plurality of selectable scan speed indicia utilizing said graphical pointer; and means for scanning for another object from among said plurality of objects at said second scan speed, in response to said selection thereof, such that a range of objects may be scanned via said extended region of said selector icon at multiple scan speeds.

7. The apparatus of claim 6 further comprising:

means for graphically altering said selector icon, in response to a particular user input, such that said selector icon is graphically augmented to include an extended northern region wherein a plurality of selectable scan speed indicia are displayed;

means for moving a graphical pointer into said extended northern region of said selector icon;

means for selecting a first scan speed indicium from among said plurality of selectable scan speed indicia utilizing said graphical pointer;

means for scanning for a particular object from among a plurality of objects at said first scan speed, in response to said selection thereof;

means for selecting a second scan speed indicium from among said plurality of selectable scan speed indicia utilizing said graphical pointer; and means for scanning for another object from among said plurality of objects at said second scan speed, in response to said selection thereof, such that a range of objects may be scanned via said extended northern region of said selector icon at multiple selectable scan speeds.

8. The apparatus of claim 7 further comprising:

means for graphically altering said selector icon, in response to a particular user input, such that said selector icon is graphically augmented to include an extended southern region wherein a plurality of selectable scan speed indicia are displayed;

means for moving a graphical pointer into said extended southern region of said selector icon;

means for selecting a first scan speed indicium from among said plurality of selectable scan speed indicia utilizing said graphical pointer;

means for scanning for a particular object from among a plurality of objects at said first scan speed, in response to said selection thereof;

means for selecting a second scan speed indicium from among said plurality of selectable scan speed indicia utilizing said graphical pointer; and scanning for another object from among said plurality of objects at said second scan speed, in response to said selection thereof, such that a range of objects may be scanned via said extended southern region of said selector icon at multiple scan speeds.

9. The apparatus of claim 1 wherein said plurality of objects further comprise:

a plurality of numbers.

10. The apparatus of claim 9 wherein each object among said plurality of objects further comprises:

a number among a plurality of numbers.

* * * * *

UNITED STATES PATENT AND TRADEMARK OFFICE
CERTIFICATE OF CORRECTION

PATENT NO. : 5,936,623
DATED : August 10, 1999
INVENTOR(S) : Amro

It is certified that error appears in the above-indentified patent and that said Letters Patent is hereby corrected as shown below:

Col. 5, Line 12 please delete "FOG." and replace with --FIG.--;

Col. 5, Line 33 please delete "56" and replace with --52--;

Col. 5, Line 43 please delete "58" and replace with --56--.

Signed and Sealed this

Twenty-eighth Day of November, 2000

Attest:

Attesting Officer

Q. TODD DICKINSON
Director of Patents and Trademarks